United States Patent
Burkardt

(10) Patent No.: US 9,752,850 B2
(45) Date of Patent: Sep. 5, 2017

(54) HOLSTER MOUNTING DEVICE

(71) Applicants: Hans Burkardt, Gilbert, AZ (US);
Nicholas Wallick, Gilbert, AZ (US)

(72) Inventor: Hans Burkardt, Gilbert, AZ (US)

(73) Assignees: Hans Burkardt, Gilbert, AZ (US);
Nicholas Wallick, Gilbert, AZ (US)

( * ) Notice: Subject to any disclaimer, the term of this patent is extended or adjusted under 35 U.S.C. 154(b) by 5 days.

(21) Appl. No.: 15/067,624

(22) Filed: Mar. 11, 2016

(65) Prior Publication Data

US 2016/0265874 A1 Sep. 15, 2016

Related U.S. Application Data

(60) Provisional application No. 62/131,323, filed on Mar. 11, 2015, provisional application No. 62/161,727, filed on May 14, 2015.

(51) Int. Cl.
*F41C 33/04* (2006.01)
*F16M 13/02* (2006.01)

(52) U.S. Cl.
CPC ......... *F41C 33/041* (2013.01); *F16M 13/022* (2013.01); *F41C 33/043* (2013.01); *F41C 33/045* (2013.01)

(58) Field of Classification Search
CPC .... F41C 33/041; F41C 33/043; F41C 33/045; F41C 33/00; F41C 33/04; F41C 33/006; F41C 33/02; F41C 33/008; F41C 33/007; F16M 13/022; A45F 3/00; A45F 5/00
USPC ....... 248/230.1, 218.4, 309.2; 42/70.11, 124, 42/127, 125, 90; 211/64; 224/243, 244, 224/255, 260, 248, 272, 666, 904
See application file for complete search history.

(56) References Cited

U.S. PATENT DOCUMENTS

| | | | | | |
|---|---|---|---|---|---|
| 2,663,083 | A | * | 12/1953 | Harms | F41G 11/001 42/126 |
| 3,835,565 | A | * | 9/1974 | Weast | F41G 11/003 42/124 |
| 6,701,660 | B2 | * | 3/2004 | Stover | F41G 11/003 42/124 |
| 7,543,405 | B1 | * | 6/2009 | Ivey | F41G 11/003 42/125 |
| 8,056,277 | B2 | * | 11/2011 | Griffin | F41C 23/16 42/71.01 |
| 8,336,247 | B2 | * | 12/2012 | Haering | F41G 11/003 42/111 |
| 8,353,125 | B2 | * | 1/2013 | Riley | F41G 11/003 248/315 |

(Continued)

*Primary Examiner* — Nkeisha Smith

(57) ABSTRACT

A holster mounting device is an apparatus used to secure a gun holster to the handlebar of a vehicle, a flat surface, or another object. The apparatus includes a holster setting which receives and secures a gun holster. The holster setting includes a setting plate, a first bracket, and a second bracket. The first bracket and the second bracket both include a clip rail. The clip rails allow the spring clip of a gun holster to be attached to the apparatus. The apparatus also includes a mount which is connected to the setting plate. One kind of mount includes a first clamping jaw and a second clamping jaw, which together may grip a handlebar. Another kind of mount includes a base plate which may be secured to a surface. A third kind of mount includes a decorative and stabilizing bezel and may be directly connected to an object or surface.

8 Claims, 13 Drawing Sheets

(56) References Cited

U.S. PATENT DOCUMENTS

| | | | | |
|---|---|---|---|---|
| 8,534,519 | B2* | 9/2013 | Hancock | B60R 9/06 224/401 |
| 8,683,732 | B2* | 4/2014 | Joplin | F41G 11/003 42/124 |
| 8,695,267 | B2* | 4/2014 | Houde-Walter | F41G 1/35 42/146 |
| 8,887,975 | B1* | 11/2014 | Basile | B62J 11/00 224/441 |
| 2002/0070324 | A1* | 6/2002 | Huang | A47G 23/0225 248/311.2 |
| 2004/0216352 | A1* | 11/2004 | Wooten | F41G 1/35 42/127 |
| 2011/0067287 | A1* | 3/2011 | Collin | F41G 11/003 42/119 |
| 2014/0131408 | A1* | 5/2014 | Brittain | F16M 13/022 224/570 |
| 2015/0320298 | A1* | 11/2015 | Missov | A61B 90/50 600/102 |

\* cited by examiner

HOLSTER MOUNTING DEVICE

The current application claims a priority to the U.S. Provisional Patent application Ser. No. 62/131,323 filed on Mar. 11, 2015 and a priority to the U.S. Provisional Patent application Ser. No. 62/161,727 filed on May 14, 2015.

FIELD OF THE INVENTION

The present invention relates generally to holster securing devices. More specifically, the present invention is a holster mounting device which allows for a gun holster to be mounted to a flat surface, a handlebar or cylindrical object, and various other objects.

BACKGROUND OF THE INVENTION

Common holster mounts are generally designed to secure a gun holster to a single object or surface. This may be the handlebar of a vehicle, a wall, a piece of furniture, or various other objects. Common holster mounts lack versatility, limiting the user to a small set of objects or surfaces which may be compatible with a specific holster mount. Moreover, common holster mounts can inconveniently mount a gun holster too close to a surface, or at an angle which is awkward for the user to access.

Accordingly, there is a present need for a holster mount which provides increased versatility in terms of mounting capabilities. Further, there is a present need for a holster mount which is easy and convenient for users to install and access. The present invention is a holster mounting device which includes various types of mounts that can be used for varying situations. The present invention includes mounts which allow a gun holster to be mounted to a handlebar, for use on an all-terrain vehicle (ATV) or motorcycle. Further, the present invention includes a mount which may be used to secure a holster at an angle relative to a surface. A third mount type allows the present invention to secure a gun holster directly to an object or surface.

DETAILED DESCRIPTION OF THE INVENTION

All illustrations of the drawings are for the purpose of describing selected versions of the present invention and are not intended to limit the scope of the present invention.

Figure 1:
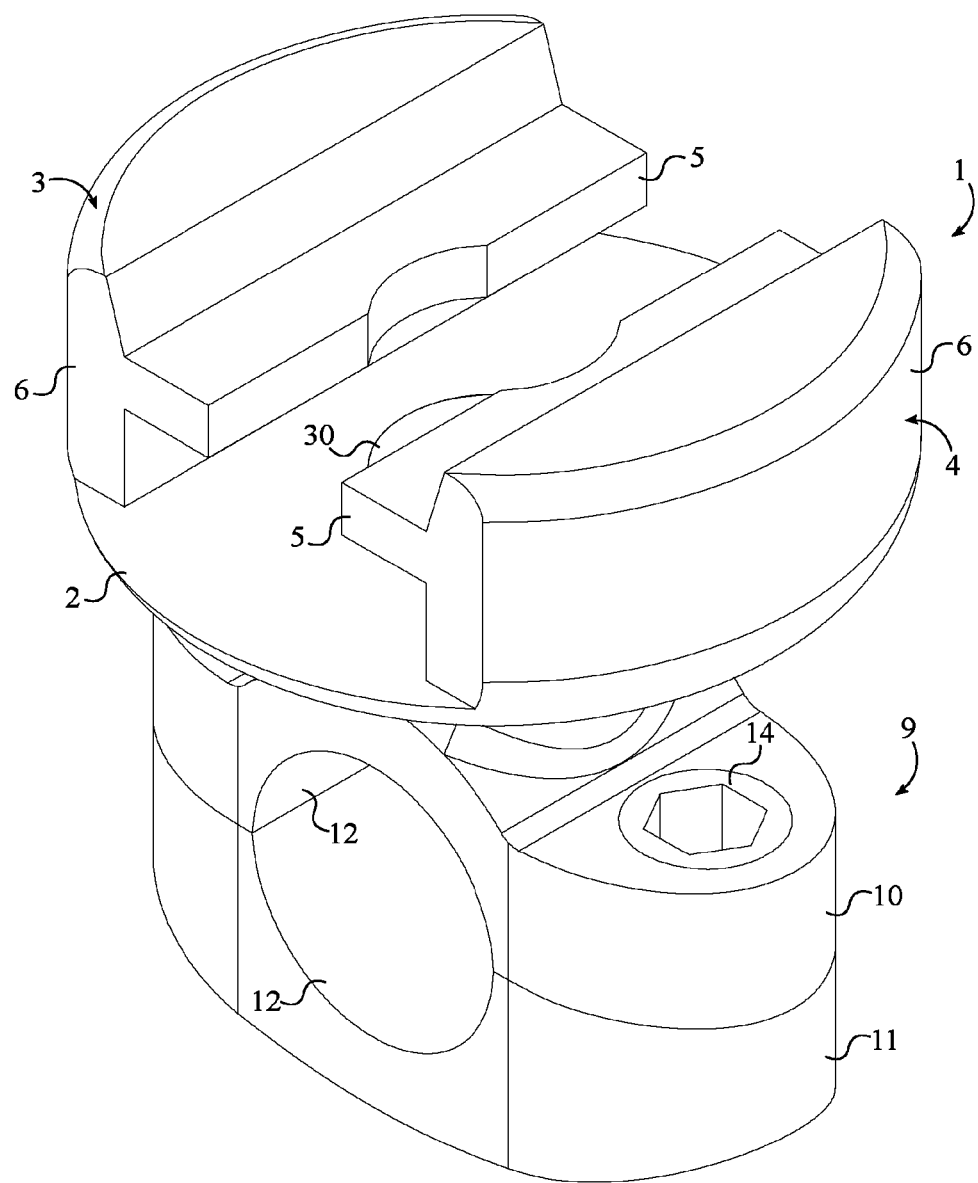
FIG. 1 is a front right perspective view of a first embodiment of the present invention, wherein the first embodiment comprises a proximal clamping jaw and a distal clamping jaw.
Figure 2:
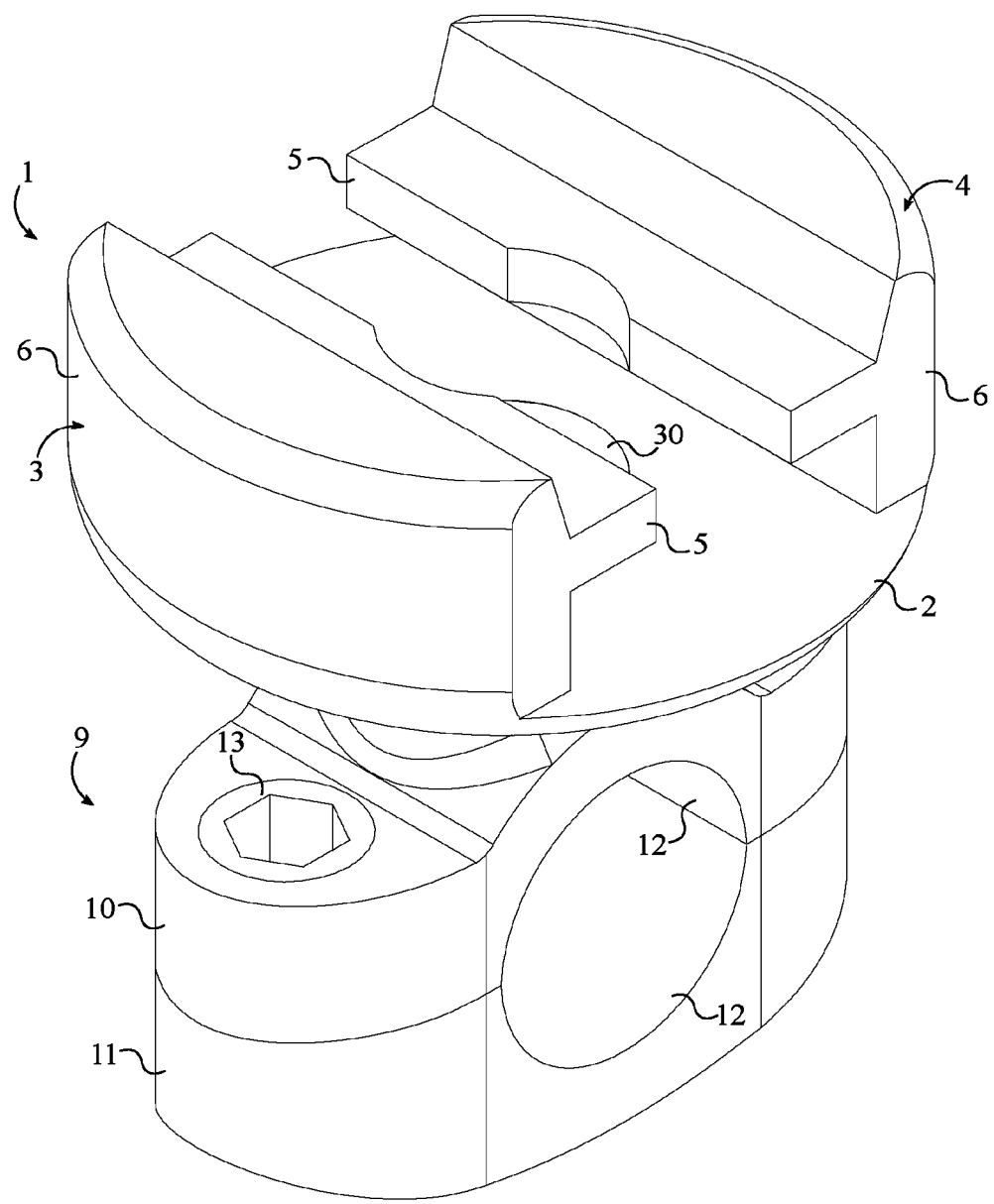
FIG. 2 is a front left perspective view of the first embodiment of the present invention.

With reference to FIGS. 1-2, the present invention is a holster mounting device which is used to secure a gun holster to the handlebar of a vehicle, a wall, or a number of other objects or surfaces. The present invention comprises a holster setting 1 and a mount 9. The holster setting 1 is used to removably mount a gun holster to the present invention. The holster setting 1 comprises a setting plate 2, a first bracket 3, and a second bracket 4. The first bracket 3 and the second bracket 4 are used to brace the gun holster from opposite sides. The first bracket 3 and the second bracket 4 each comprise a clip rail 5 and a bracket body 6. The clip rail 5 is designed so that a spring clip may be attached to the clip rail 5. The bracket body 6 is connected onto the setting plate 2 and is used to elevate and support the clip rail 5 so that the spring clip of the gun holster may slide in between the clip rail 5 and the setting plate 2. The bracket body 6 of the first bracket 3 and the bracket body 6 of the second bracket 4 are positioned opposite to each other about the setting plate 2. The clip rail 5 is connected adjacent to the bracket body 6 and is positioned parallel to the setting plate 2. The clip rail 5 of the first bracket 3 and the clip rail 5 of the second bracket 4 are oriented towards each other and are positioned parallel to each other. This arrangement allows the first bracket 3 and the second bracket 4 to prevent the spring clip of the gun holster from sliding on the clip rail 5. The mount 9 is used to secure the present invention, along with a gun holster to a surface or the handlebar of a vehicle. The mount 9 is connected onto the setting plate 2, opposite to the first bracket 3 and the second bracket 4. When a gun holster is attached to the present invention, the positioning of the mount 9 orients the gun holster away from the object or surface that the gun holster is being mounted to. This allows the gun holster to be easily removed if needed.

Figure 3:
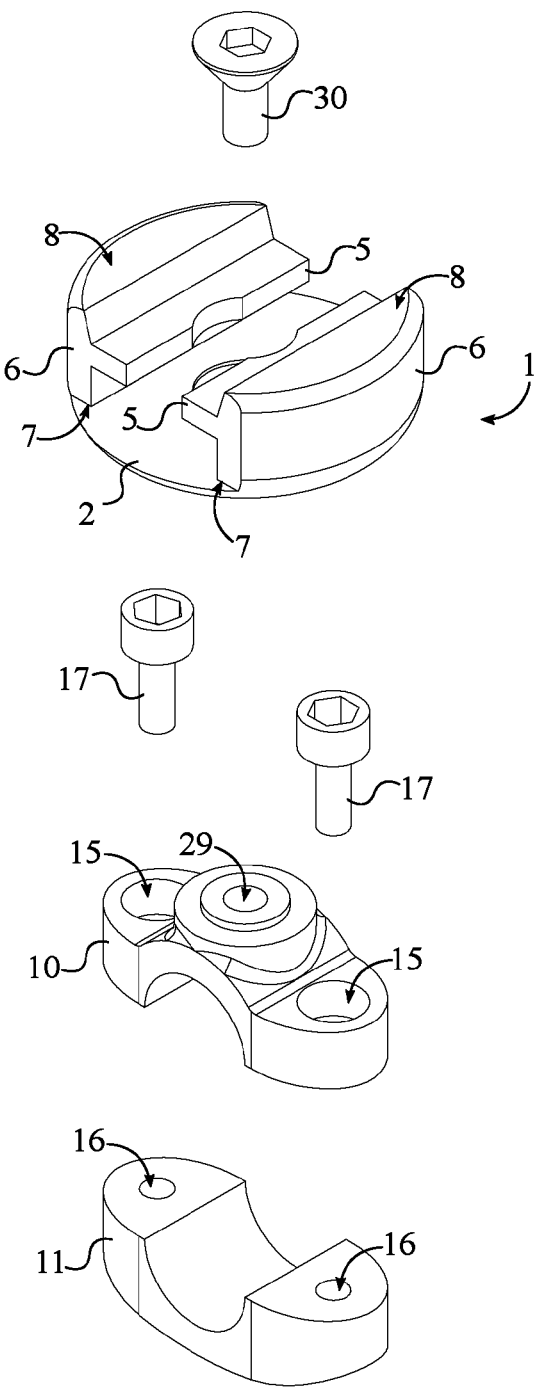
FIG. 3 is an exploded perspective view of the first embodiment of the present invention.

In reference to FIGS. 2-3, the bracket body 6 comprises a proximal end 7 and a distal end 8. The proximal end 7 is positioned adjacent to the setting plate 2 and the distal end 8 is positioned opposite to the proximal end 7 along the bracket body 6. The clip rail 5 is positioned in between the proximal end 7 and the distal end 8. This arrangement is advantageous because by offsetting the clip rail 5 from the proximal end 7, the spring clip of the gun holster is able to slide in between the setting plate 2 and the clip rail 5. Further, offsetting the clip rail 5 from the distal end 8 helps to limit the movement of the gun holster when attached to the present invention.

In a first embodiment of the present invention, shown in FIGS. 1-3, the mount 9 comprises a proximal clamping jaw 10 and a distal clamping jaw 11. Together, the proximal clamping jaw 10 and the distal clamping jaw 11 are used to clamp about a handlebar or similar cylindrical object. The proximal clamping jaw 10 is fastened adjacent to the setting plate 2. The distal clamping jaw 11 is fastened adjacent to the proximal clamping jaw 10, opposite to the setting plate 2. The proximal clamping jaw 10 and the distal clamping jaw 11 may be tightened or loosened with respect to each other in order to fix the present invention in place or to adjust the position of the present invention.

Figure 4:
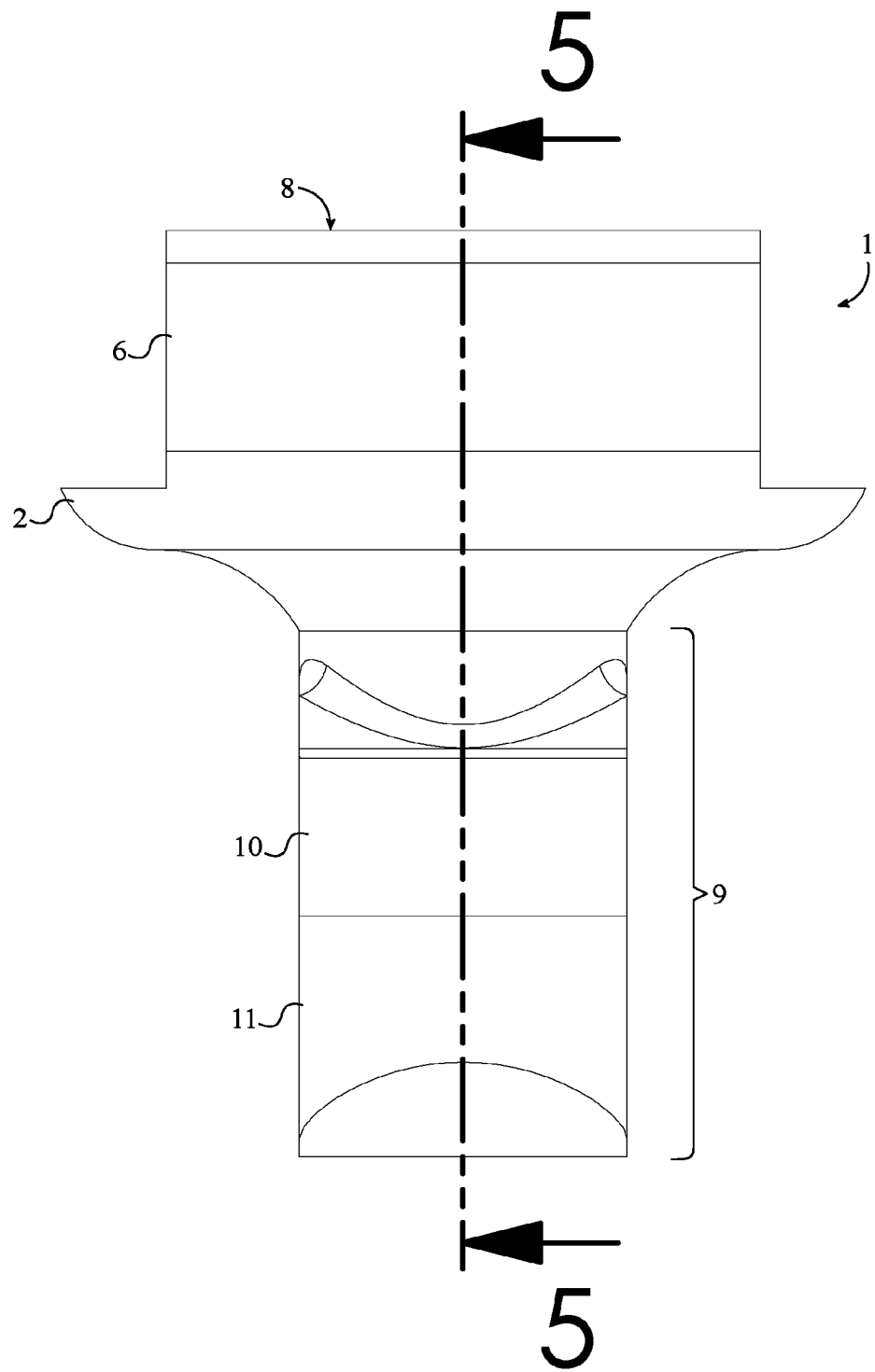
FIG. 4 is a left side view of the first embodiment of the present invention.
Figure 5:
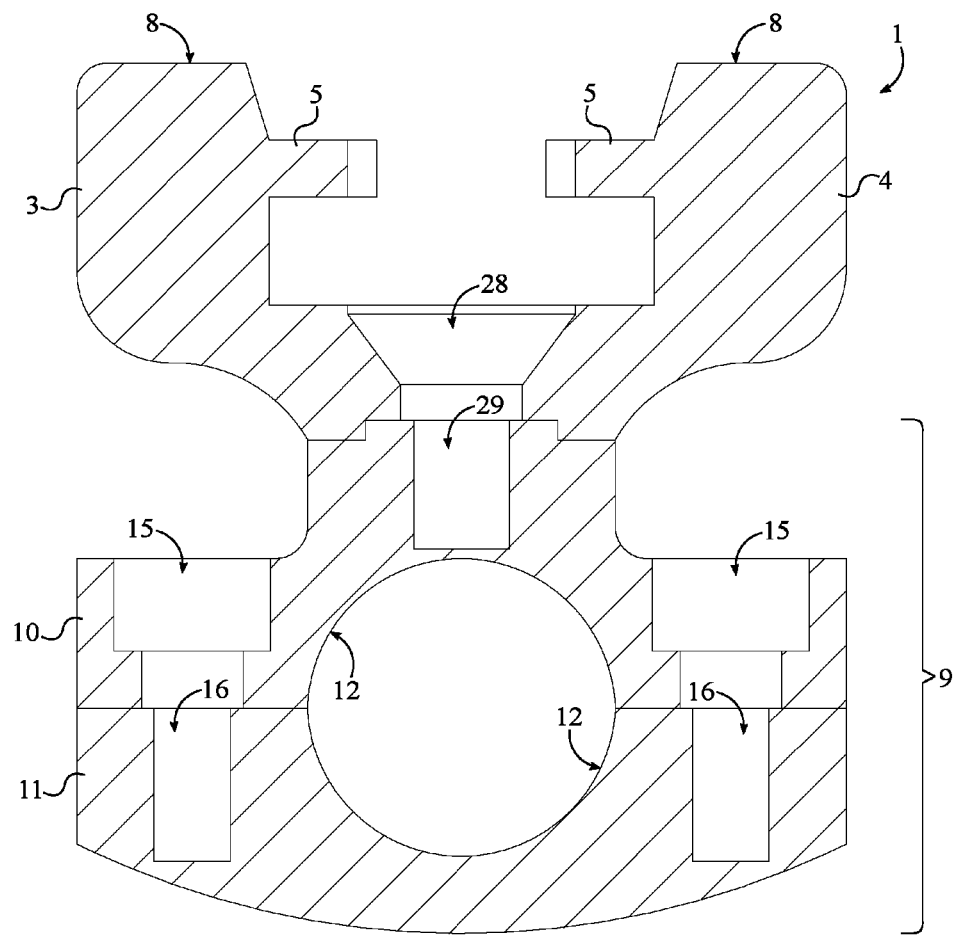
FIG. 5 is a section view of the first embodiment of the present invention taken along line 5 in FIG. 4.

In reference to FIGS. 3-5, the present invention further comprises a main hole 28, a threaded mount hole 29, and an elongated fastener 30. The main hole 28 traverses normal and through the setting plate 2. The main hole 28 also traverses through the clip rail 5 of the first bracket 3 and the clip rail 5 of the second bracket 4. This is done so that the elongated fastener 30 may be inserted through the main hole 28 without being obstructed by the clip rail 5 of the first bracket 3 and the clip rail 5 of the second bracket 4. The threaded mount hole 29 traverses into the proximal clamping jaw 10 and is used to secure the elongated fastener 30. The main hole 28 and the threaded mount hole 29 are concentrically aligned with each other so that the elongated fastener 30 can be positioned through the main hole 28 and engage to the threaded mount hole 29. When the elongated fastener 30 is engaged to the threaded mount hole 29 and tightened, the holster setting 1 and the proximal clamping jaw 10 become fastened to each other.

In reference to FIG. 1, the proximal clamping jaw 10 and the distal clamping jaw 11 each comprise a bar-receiving groove 12. The bar-receiving groove 12 of the proximal clamping jaw 10 and the bar-receiving groove 12 of the distal clamping jaw 11 are positioned adjacent to each other and are oriented towards each other. This allows the bar-receiving groove 12 of the proximal clamping jaw 10 and the bar-receiving groove 12 of the second jaw to be clamped about a handlebar or a similar cylindrical object.

In reference to FIGS. 1-3, the mount 9 further comprises a first jaw fastening feature 13 and a second jaw fastening feature 14. Together, the first jaw fastening feature 13 and the second jaw fastening feature 14 are used to clamp the proximal clamping jaw 10 and the distal clamping jaw 11 together. The first jaw fastening feature 13 and the second jaw fastening feature 14 each comprise a proximal hole 15, a distal threaded hole 16, and a clamping fastener 17. The first jaw fastening feature 13 and the second jaw fastening feature 14 are positioned opposite to each other along the mount 9. The first bar-receiving groove 12 and the second bar-receiving groove 12 are positioned equidistant from the first jaw fastening feature 13 and from the second jaw fastening feature 14 so that the mount 9 may be evenly clamped onto a handlebar. The proximal hole 15 traverses through the proximal clamping jaw 10, and the distal threaded hole 16 traverses into the distal clamping jaw 11. The proximal hole 15 and the distal threaded hole 16 are concentrically aligned with each other so that the clamping fastener 17 may be positioned through the proximal hole 15 and engaged to the distal threaded hole 16. When the clamping fastener 17 of the first jaw fastening feature 13 and the clamping fastener 17 of the second jaw fastening feature 14 are each engaged to their corresponding distal threaded hole 16 and tightened, the proximal clamping jaw 10 and the distal clamping jaw 11 become fastened to each other. In some embodiments of the present invention, a distal threaded hole 16 is a female-threaded hole, and a clamping fastener 17 is a male-threaded fastener.

Figure 6:
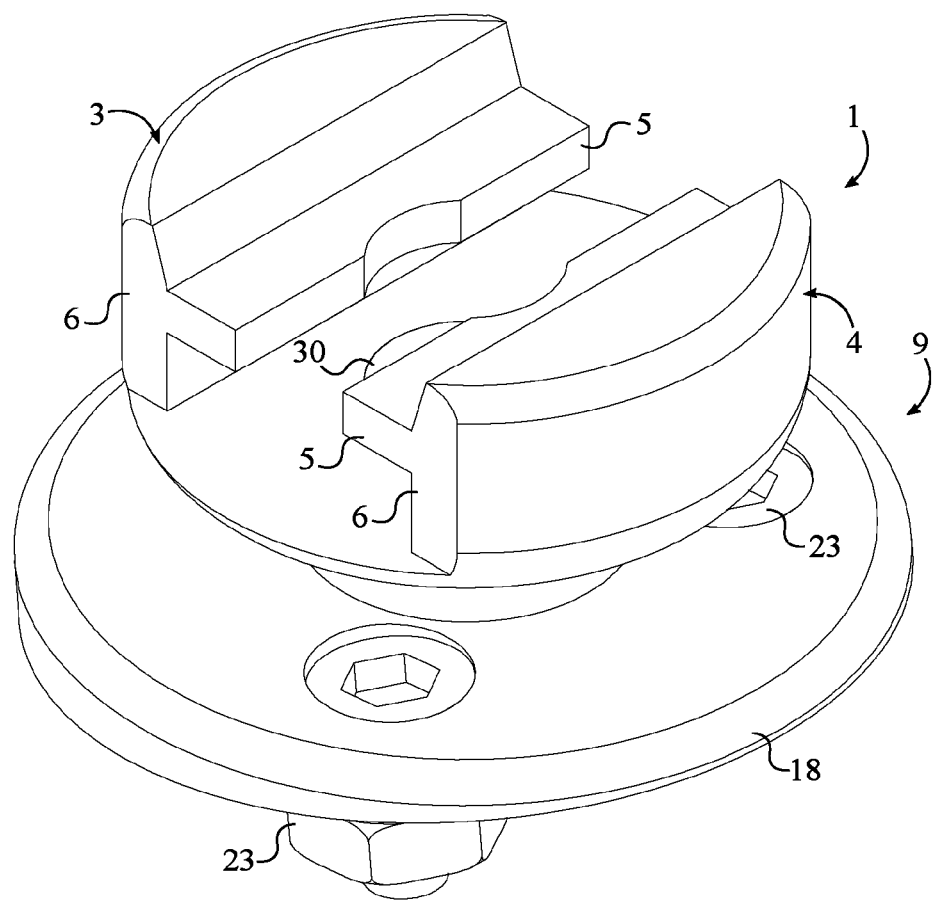
FIG. 6 is a front right perspective view of a second embodiment of the present invention, wherein the second embodiment comprises a base plate.
Figure 7:
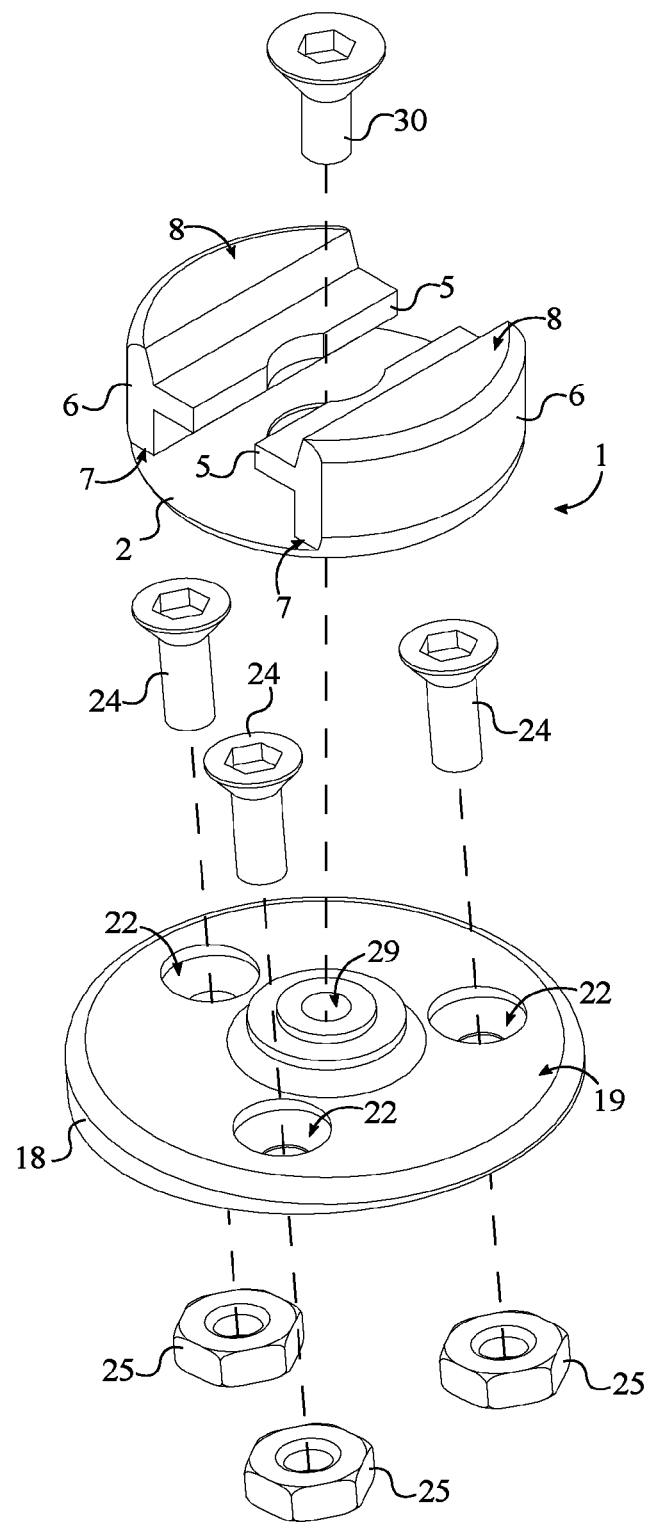
FIG. 7 is an exploded perspective view of the second embodiment of the present invention.

In a second embodiment of the present invention, shown in FIGS. 6-7, the mount 9 comprises a base plate 18 and a plurality of fastening holes 22. The base plate 18 is used to secure the present invention to any flat surface. The base plate 18 is fastened adjacent to the setting plate 2, opposite to the first bracket 3 and the second bracket 4. The plurality of fastening holes 22 traverses through the base plate 18 and are peripherally distributed on the base plate 18. The plurality of fastening holes 22 provides a means of screwing or bolting the base plate 18 to the surface in which the present invention is to be mounted.

Figure 8:
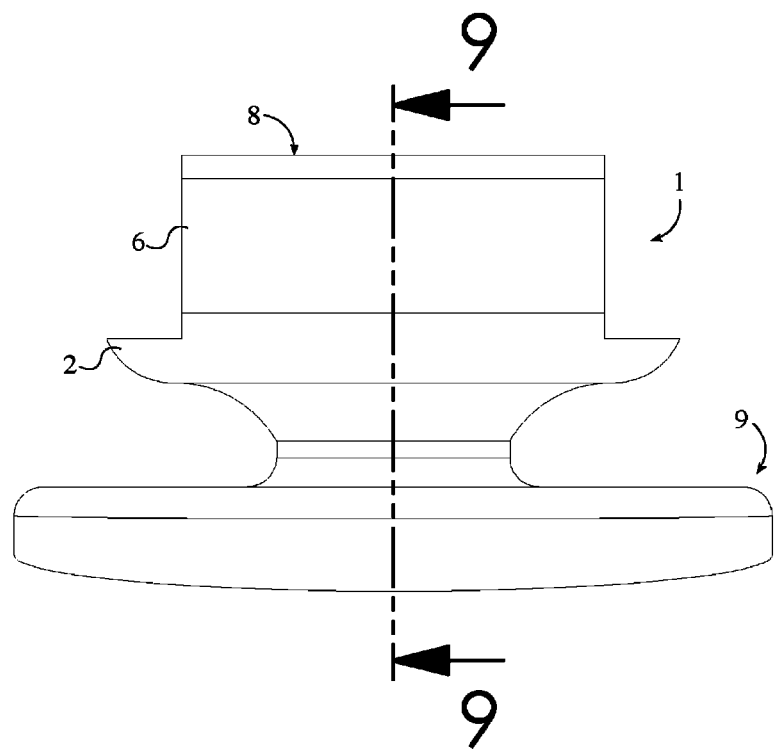
FIG. 8 is a left side view of the second embodiment of the present invention.
Figure 9:
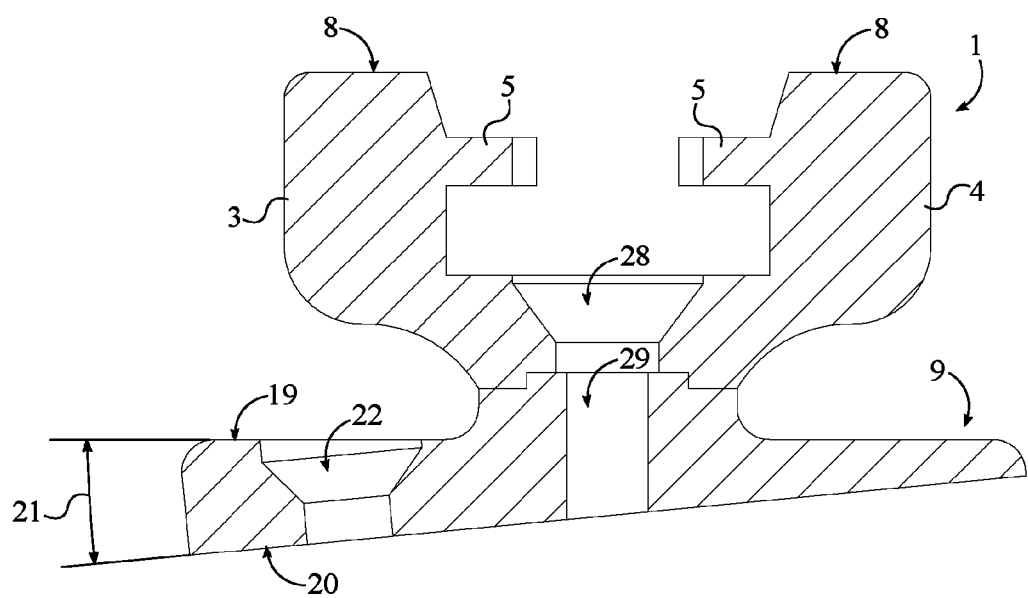
FIG. 9 is a section view of the second embodiment of the present invention taken along line 9 in FIG. 8.

Instead of traversing into the proximal clamping jaw 10, in the second embodiment of the present invention, the threaded mount hole 29 traverses through the base plate 18. This is shown in FIGS. 7-9. Similar to the first embodiment of the present invention, the threaded mount hole 29 is designed to engage with the elongated fastener 30. The elongated fastener 30 is positioned through the main hole 28 and is engaged to the threaded mount hole 29. When the elongated fastener 30 is engaged to the threaded mount hole 29 and tightened, the holster setting 1 and the base plate 18 become fastened to each other.

The mount 9 further comprises a plurality of base fastening features 23. The plurality of base fastening features 23 is used to mount the base plate 18 to a surface. Each of the plurality of base fastening features 23 comprises a base fastener 24 and a base fastening anchor 25. The base fastener 24 is positioned through a corresponding hole from the plurality of fastening holes 22. The base fastener 24 is engaged to the base fastening anchor 25 and is positioned adjacent to the base plate 18, opposite to the setting plate 2. In this configuration, the base fastener 24 may be inserted through the surface in which the present invention is to be mounted. The base fastening anchor 25 may then be engaged to the base fastener 24 such that the base plate 18 and the base fastening anchor 25 are pressed against opposite sides of the mounting surface. In some embodiments of the present invention, the base fastener 24 is a bolt, and the base fastening anchor 25 is a nut.

In reference to FIGS. 6-7, the base plate 18 comprises a first surface 19 and a second surface 20. The first surface 19 is positioned adjacent to the setting plate 2. The first surface 19 and the second surface 20 are oriented at an acute angle 21 with each other. This arrangement allows the holster setting 1 to be oriented at an angle relative to the mounting surface. By doing this, when a gun holster is attached to the present invention, the gun holster may be positioned in a way that is convenient for the user.

Figure 10:
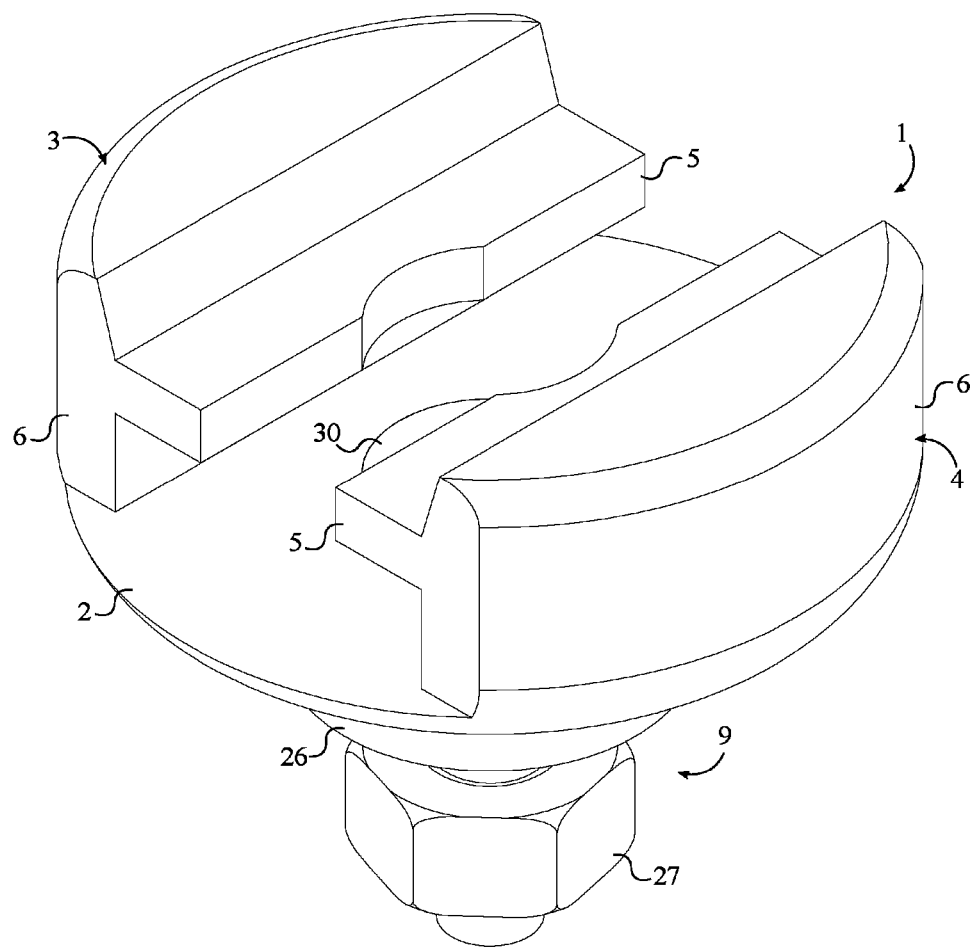
FIG. 10 is a front right perspective view of a third embodiment of the present invention, wherein the third embodiment comprises a bezel.
Figure 11:
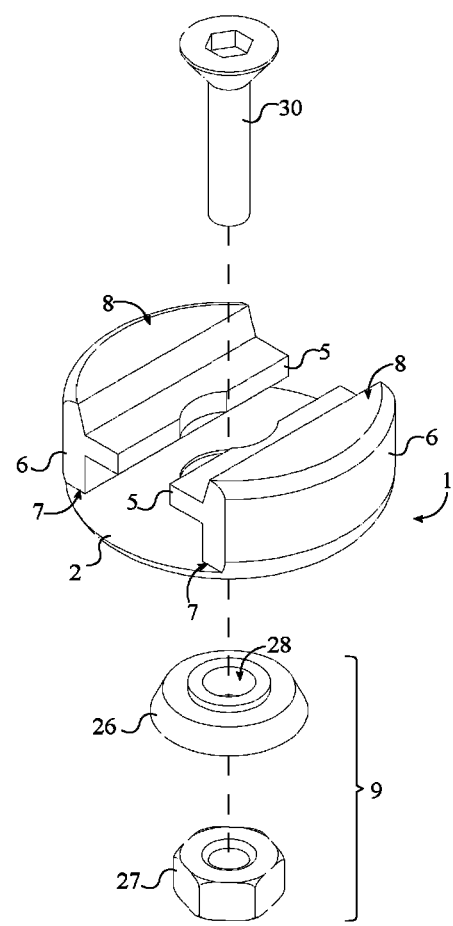
FIG. 11 is an exploded perspective view of the third embodiment of the present invention.
Figure 12:
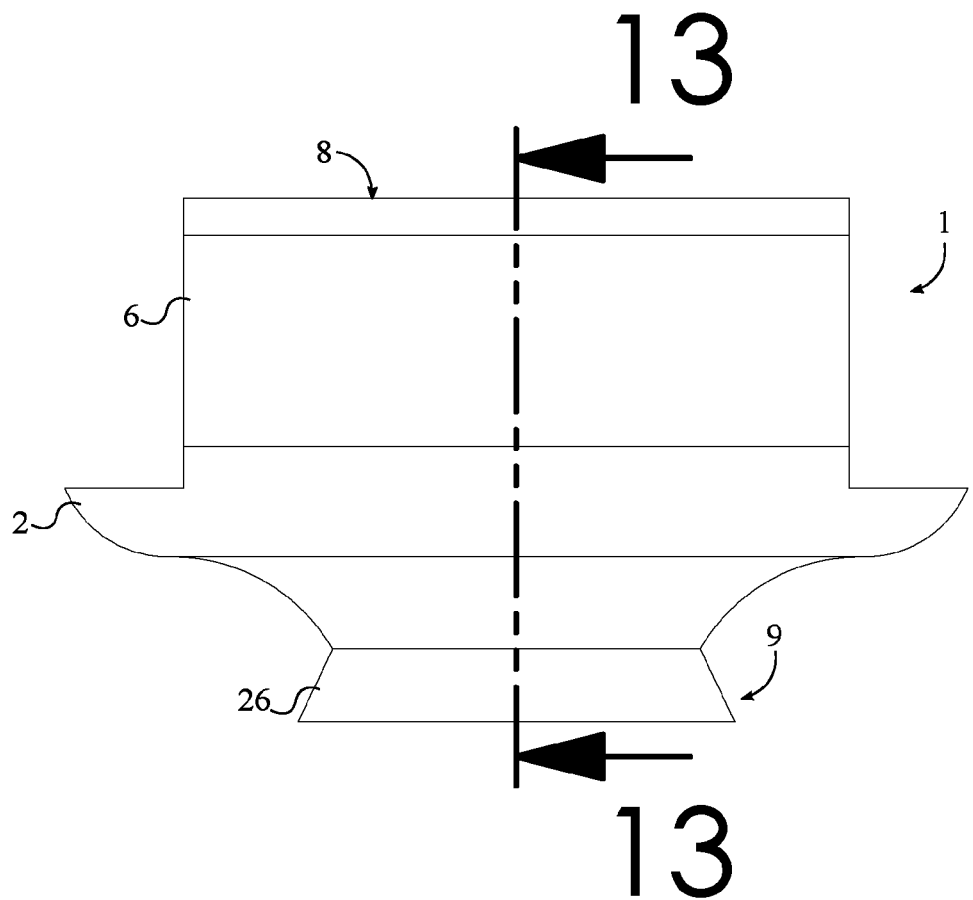
FIG. 12 is a left side view of the third embodiment of the present invention.
Figure 13:
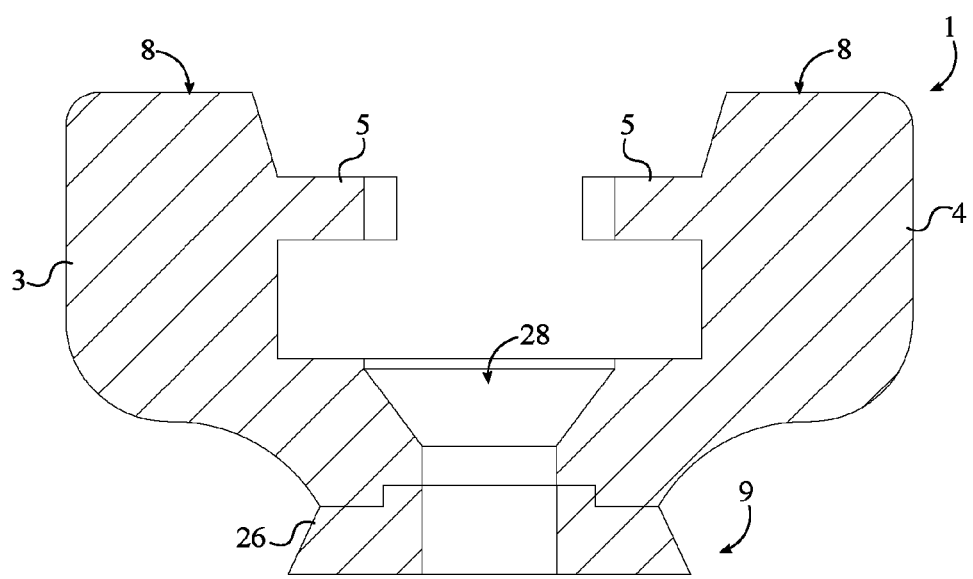
FIG. 13 is a section view of the third embodiment of the present invention taken along line 13 in FIG. 12.

In a third embodiment of the present invention, shown in FIGS. 10-11, the mount 9 comprises a bezel 26 and a bezel fastening anchor 27. The bezel 26 is positioned adjacent to the setting plate 2 and gives the present invention a decorative look, while also creating a stable interface for the setting plate 2 to be secured to an object or surface. The main hole 28 traverses normal and through the setting plate 2 and the bezel 26. This is shown in FIGS. 12-13. The elongated fastener 30 is positioned through the main hole 28 and the bezel 26 and is engaged to the bezel fastening anchor 27. The bezel fastening anchor 27 is positioned adjacent to the bezel 26, opposite to the setting plate 2, and is used to secure the present invention to a surface or object. In this configuration, the elongated fastener 30 may be inserted through the surface in which the present invention is to be mounted. The bezel fastening anchor 27 may then be engaged to the elongated fastener 30 such that the bezel 26 and the bezel fastening anchor 27 are pressed against opposite sides of the mounting surface. In doing this, the bezel 26 is secured in place between the setting plate 2 and the mounting surface.

Although the invention has been explained in relation to its preferred embodiment, it is to be understood that many other possible modifications and variations can be made without departing from the spirit and scope of the invention as hereinafter claimed.

What is claimed is:

1. A holster mounting device comprising:
a holster setting;
the holster setting comprising a setting plate, a first bracket and a second bracket;
the first bracket and the second bracket each comprising a clip rail and a bracket body;
the bracket body being connected onto the setting plate;
the bracket body of the first bracket and the bracket body of the second bracket being positioned opposite to each other about the setting plate;
the clip rail being connected adjacent to the bracket body;
the clip rail being positioned parallel to the setting plate;
the clip rail of the first bracket and the clip rail of the second bracket being oriented towards each other;
the clip rail of the first bracket and the clip rail of the second bracket being positioned parallel to each other;
a mount;
the mount being connected onto the setting plate, opposite to the first bracket and the second bracket;
the mount comprising a proximal clamping jaw and a distal clamping jaw;
the proximal clamping jaw being fastened adjacent to the setting plate;
the distal clamping jaw being fastened adjacent to the proximal clamping jaw, opposite to the setting plate;
a main hole;
a threaded mount hole;
an elongated fastener;
the main hole traversing normal and through the setting plate;
the threaded mount hole traversing into the proximal clamping jaw;
the main hole and the threaded mount hole being concentrically aligned with each other;
the elongated fastener being positioned through the main hole; and
the elongated fastener being engaged to the threaded mount hole.

2. The holster mounting device as claimed in claim 1 further comprising:
the bracket body comprising a proximal end and a distal end;
the proximal end being positioned adjacent to the setting plate;
the distal end being positioned opposite to the proximal end along the bracket body; and
the clip rail being positioned in between the proximal end and the distal end.

3. The holster mounting device as claimed in claim 1 further comprising:
the proximal clamping jaw and the distal clamping jaw each comprising a bar-receiving groove;
the bar-receiving groove of the proximal clamping jaw and the bar-receiving groove of the distal clamping jaw being positioned adjacent to each other; and
the bar-receiving groove of the proximal clamping jaw and the bar-receiving groove of the distal clamping jaw being oriented towards each other.

4. The holster mounting device as claimed in claim 1 further comprising:
the mount further comprising a first jaw fastening feature and a second jaw fastening feature;
the first jaw fastening feature and the second jaw fastening feature each comprising a proximal hole, a distal threaded hole and a clamping fastener;
the first jaw fastening feature and the second jaw fastening feature being positioned opposite to each other along the mount;
the proximal hole traversing through the proximal clamping jaw;
the distal threaded hole traversing into the distal clamping jaw;
the proximal hole and the distal threaded hole being concentrically aligned with each other;
the clamping fastener being positioned through the proximal hole; and
the clamping fastener being engaged to the distal threaded hole.

5. A holster mounting device comprising:
a holster setting;
a mount;
the holster setting comprising a setting plate, a first bracket and a second bracket;
the mount comprising a proximal clamping jaw and a distal clamping jaw;
the first bracket and the second bracket each comprising a clip rail and a bracket body;
the bracket body being connected onto the setting plate;
the bracket body of the first bracket and the bracket body of the second bracket being positioned opposite to each other about the setting plate;
the clip rail being connected adjacent to the bracket body;
the clip rail being positioned parallel to the setting plate;
the clip rail of the first bracket and the clip rail of the second bracket being oriented towards each other;
the clip rail of the first bracket and the clip rail of the second bracket being positioned parallel to each other;
the mount being connected onto the setting plate, opposite to the first bracket and the second bracket;
the proximal clamping jaw being fastened adjacent to the setting plate;
the distal clamping jaw being fastened adjacent to the proximal clamping jaw, opposite to the setting plate;
a main hole;
a threaded mount hole;
an elongated fastener;
the main hole traversing through the clip rail of the first bracket and the clip rail of the second bracket;
the main hole further traversing normal and through the setting plate;
the threaded mount hole traversing into the proximal clamping jaw;
the main hole and the threaded mount hole being concentrically aligned with each other;
the elongated fastener being positioned through the main hole; and
the elongated fastener being engaged to the threaded mount hole.

6. The holster mounting device as claimed in claim 5 further comprising:
the bracket body comprising a proximal end and a distal end;
the proximal end being positioned adjacent to the setting plate;
the distal end being positioned opposite to the proximal end along the bracket body; and
the clip rail being positioned in between the proximal end and the distal end.

7. The holster mounting device as claimed in claim 5 further comprising:
the proximal clamping jaw and the distal clamping jaw each comprising a bar-receiving groove;

the bar-receiving groove of the proximal clamping jaw and the bar-receiving groove of the distal clamping jaw being positioned adjacent to each other; and the bar-receiving groove of the proximal clamping jaw and the bar-receiving groove of the distal clamping jaw being oriented towards each other.

8. The holster mounting device as claimed in claim 5 further comprising:

the mount further comprising a first jaw fastening feature and a second jaw fastening feature;

the first jaw fastening feature and the second jaw fastening feature each comprising a proximal hole, a distal threaded hole and a clamping fastener;

the first jaw fastening feature and the second jaw fastening feature being positioned opposite to each other along the mount;

the proximal hole traversing through the proximal clamping jaw;

the distal threaded hole traversing into the distal clamping jaw;

the proximal hole and the distal threaded hole being concentrically aligned with each other;

the clamping fastener being positioned through the proximal hole; and the clamping fastener being engaged to the distal threaded hole.

* * * * *